United States Patent
Arakawa et al.

(10) Patent No.: US 9,308,847 B2
(45) Date of Patent: Apr. 12, 2016

(54) LUMBAR SUPPORT OPERATION MEMBER AND VEHICLE SEAT

(71) Applicant: NHK SPRING CO., LTD., Yokohama-shi (JP)

(72) Inventors: Shinji Arakawa, Yokohama (JP);
Akihiro Hayashi, Yokohama (JP);
Hiroshi Tsunashima, Yokohama (JP);
Kozo Yamaura, Yokohama (JP)

(73) Assignee: NHK SPRING CO., LTD., Yokohama-Shi (JP)

( * ) Notice: Subject to any disclaimer, the term of this patent is extended or adjusted under 35 U.S.C. 154(b) by 37 days.

(21) Appl. No.: 13/925,290

(22) Filed: Jun. 24, 2013

(65) Prior Publication Data

US 2013/0341981 A1 Dec. 26, 2013

(30) Foreign Application Priority Data

Jun. 25, 2012 (JP) .................................. 2012-142075

(51) Int. Cl.
*B60N 2/66* (2006.01)
(52) U.S. Cl.
CPC ........................................ *B60N 2/66* (2013.01)
(58) Field of Classification Search
CPC ........................................................ B60N 2/66
USPC .................. 297/284.4, 354.12, 463.1, 463.2; 16/430
See application file for complete search history.

(56) References Cited

U.S. PATENT DOCUMENTS

| 4,094,210 | A | * | 6/1978 | Wirtz et al. ...................... 16/441 |
| 5,215,350 | A | * | 6/1993 | Kato ........................... 297/284.4 |
| 5,393,116 | A | * | 2/1995 | Bolsworth et al. .......... 296/65.03 |
| 5,495,641 | A | * | 3/1996 | Going et al. .................... 16/414 |
| 5,651,584 | A | * | 7/1997 | Chenot et al. ............. 297/284.4 |
| 5,918,945 | A | * | 7/1999 | Martens et al. ............ 297/463.1 |
| 7,325,876 | B2 | * | 2/2008 | Lavoie et al. ............ 297/378.12 |
| 8,011,269 | B2 | * | 9/2011 | Elliot et al. ................ 297/284.4 |
| 2002/0140277 | A1 | * | 10/2002 | Pan ............................. 297/463.1 |
| 2009/0265891 | A1 | * | 10/2009 | Pett et al. ........................ 16/430 |

FOREIGN PATENT DOCUMENTS

| JP | H04132830 U | 12/1992 |
| JP | 2006-168658 A | 6/2006 |
| JP | 2010-111244 A | 5/2010 |

OTHER PUBLICATIONS

Notice of Reasons for Rejection mailed Jan. 26, 2016 in corresponding Japanese Patent Application No. 2012-142075.

* cited by examiner

*Primary Examiner* — Peter Brown
(74) *Attorney, Agent, or Firm* — Knobbe Martens Olson & Bear LLP

(57) ABSTRACT

A lumbar support operation member comprising a shaft attachment portion that is configured so as to be fixed to a rotation shaft that transmits rotation force to a moving mechanism of a lumbar support provided to a seatback and that is positioned at a side portion of the seatback; and operation portions that are provided at an radial direction outside of the shaft attachment portion, that are separated from each other in a circumferential direction of the shaft attachment portion, and that make the shaft attachment portion rotate.

6 Claims, 7 Drawing Sheets

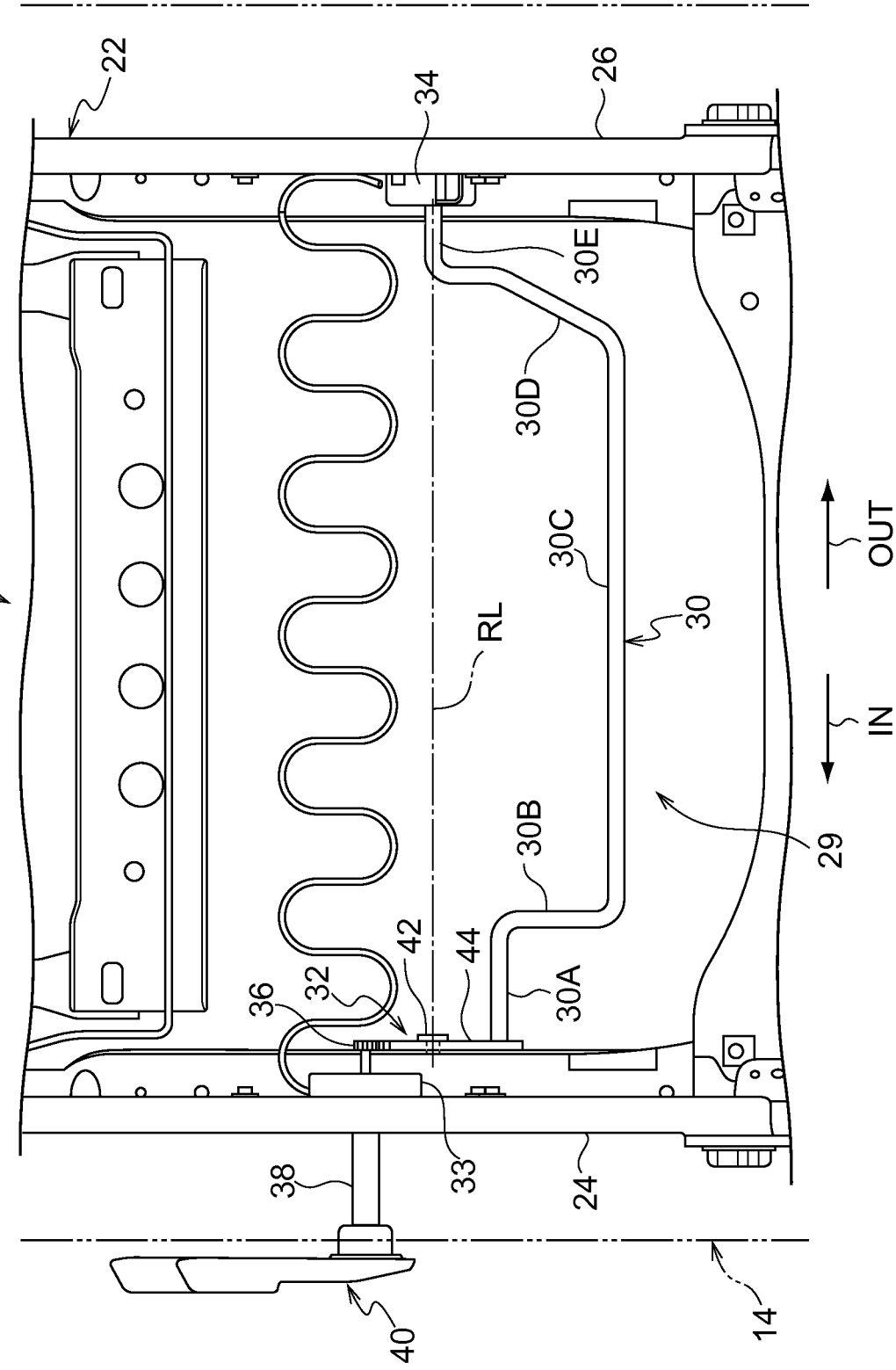

LUMBAR SUPPORT OPERATION MEMBER AND VEHICLE SEAT

CROSS-REFERENCE TO RELATED APPLICATION

This application claims priority under 35 USC 119 from Japanese Patent Application, No. 2012-142075 filed Jun. 25, 2012, the disclosure of which is incorporated by reference herein.

BACKGROUND OF THE INVENTION

1. Technical Field

The present invention relates to an operation member employed in moving a lumbar support provided to a seatback of a vehicle seat in directions towards and away from a seated occupant, and also relates to a vehicle seat.

2. Related Art

Technology exists, for example as described in Japanese Patent Application Laid-Open (JP-A) No. 2006-168658 and in JP-A No. 2010-111244, in which a lumbar support is provided to a seatback of a vehicle seat of an automobile.

SUMMARY

Conventional lumbar supports are configured such that a single lever provided to a side portion of the seatback is rotated to move the lumbar support.

There is a need to increase an angle of operation of the lever in order to increase the movement amount of the lumbar support. However when a console box is disposed at the side of the vehicle seat where the lever is provided, the lever enters a narrow gap between the console box and the seatback, such that a large angle of operation of the lever is not possible.

In consideration of the above circumstances, a subject of the present invention is to provide a lumbar support operation member that enables a large angle of operation, and a vehicle seat.

A lumbar support operation member of a first aspect of the present invention includes: a shaft attachment portion that is configured so as to be fixed to a rotation shaft that transmits rotation force to a moving mechanism of a lumbar support provided to a seatback and that is positioned at a side portion of the seatback; and operation portions that are provided at a radial direction outside of the shaft attachment portion and that are separated from each other in a circumferential direction of the shaft attachment portion, and that make the shaft attachment portion rotate.

The lumbar support operation member of the first aspect is configured such that the shaft attachment portion is fixed to the rotation shaft that transmits rotation force to the moving mechanism of the lumbar support provided to the seatback. The operation portions provided at the radial direction outside of the shaft attachment portion are separated from each other in the circumferential direction of the shaft attachment portion. The rotation shaft can accordingly be rotated using any of the operation portions.

When it becomes difficult to operate one particular operation portion, the rotation shaft can be rotated using another of the operation portions, thereby enabling a large angle of operation for the rotation shaft with respect to the lumbar support moving mechanism.

A second aspect of the present invention is the lumbar support operation member of the first aspect, wherein the operation portions are configured by two levers that extend from the shaft attachment portion towards the radial direction outside of the shaft attachment portion.

In the lumbar support operation member of the second aspect, due to providing the two levers, either of the levers can be used to rotate the rotation shaft. When it becomes difficult to operate one lever, the other lever can be used to rotate the rotation shaft, thereby enabling the rotation shaft to be moved in a large angle of operation with respect to the lumbar support moving mechanism.

A third aspect of the present invention is the lumbar support operation member of the first aspect, wherein the operation portion is configured by two protrusions provided at an outer peripheral portion of an operation plate that extends from the shaft attachment portion towards the radial direction outside of the haft attachment portion.

In the lumbar support operation member of the third aspect, due to providing the two protrusions at the outer peripheral portion of the operation plate, either of the protrusions can be used to rotate the rotation shaft. When it becomes difficult to operate one protrusion, the other protrusion can be used to rotate the rotation shaft, thereby enabling the rotation shaft to be moved in a large angle of operation with respect to the lumbar support moving mechanism.

A vehicle seat of a fourth aspect of the present invention includes: a moving mechanism that moves a lumbar support provided to a seatback; a rotation shaft that is positioned at a side portion of the seatback, and that operates the moving mechanism; and the lumbar support operation member of any one of the first aspect to the third aspect, which is attached to the rotation shaft.

The vehicle seat of the fourth aspect is provided with the moving mechanism that moves the lumbar support at the seatback. The moving mechanism is provided with the rotation shaft at the side portion of the seatback and the rotation shaft operates the moving mechanism. Movement of the lumbar support can accordingly be performed by rotation operation of the rotation shaft. The lumbar support operation member of any one of the first aspect to the third aspect is attached to the rotation shaft, thereby enabling the rotation shaft to be moved in large angle of operation as explained above.

According to the lumbar support operation member of the first aspect, a larger angle of operation for the rotation shaft is enabled than when a single operation portion is provided. The movement amount of the lumbar support can accordingly be increased.

According to the lumbar support operation member of the second aspect, due to providing the two levers, either one of the levers can be operated to rotate the rotation shaft. When operation becomes difficult, the other lever can be used to rotate the rotation shaft, thereby enabling a larger angle of operation for the rotation shaft than in cases in which a single lever is provided.

According to the lumbar support operation member of the third aspect, due to providing the two protrusions, either of the protrusions can be operated to rotate the rotation shaft. When operation becomes difficult, the other protrusion can be used to rotate the rotation shaft, thereby enabling a larger angle of operation for the rotation shaft than in cases in which a single protrusion is provided.

According to the vehicle seat of the fourth aspect, the lumbar support operation member of any one of the first aspect to the third aspect is attached to the rotation shaft, thereby enabling a large angle of operation for the rotation shaft, and also enabling the movement amount of the lumbar support to be increased.

BRIEF DESCRIPTION OF THE DRAWINGS

Embodiments of the present invention will be described in detail based on the following figures, wherein:

FIG. 3 is a front view of a seatback, illustrating a lumbar support mechanism;

DETAILED DESCRIPTION OF THE INVENTION

Figure 1:
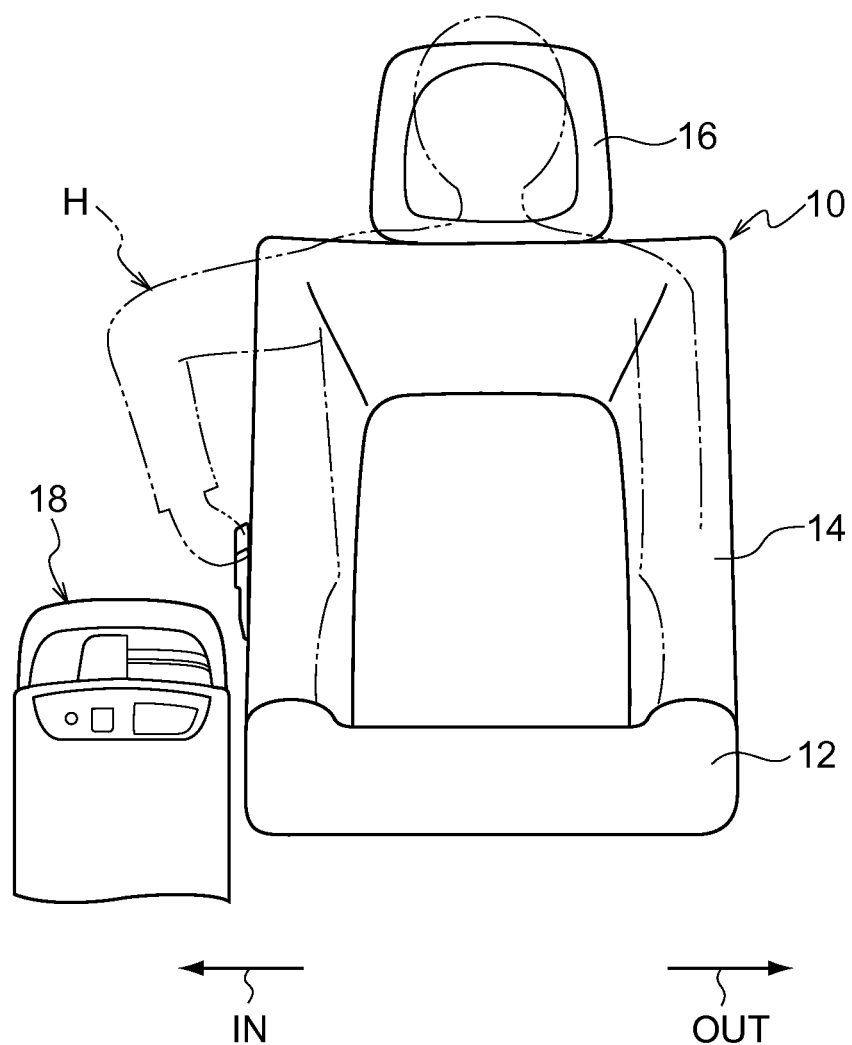
FIG. 1 is a front view illustrating a vehicle seat according to an exemplary embodiment of the present invention and a console box.

As illustrated in FIG. 1, a vehicle seat 10 of the present exemplary embodiment is a vehicle seat of, for example, an automobile, and is configured including a seat cushion 12 on which an occupant H sits, a seatback 14 employed as a back support for the occupant H, that is provided at a rear end portion of the seat cushion 12 so as to be capable of reclining, and a headrest 16 that is disposed at an upper end portion of the seatback 14 so as to be height-adjustable.

In the present exemplary embodiment, a console box 18 is disposed further to a vehicle central side (the arrow IN direction side) than the vehicle seat 10.

Figure 2:
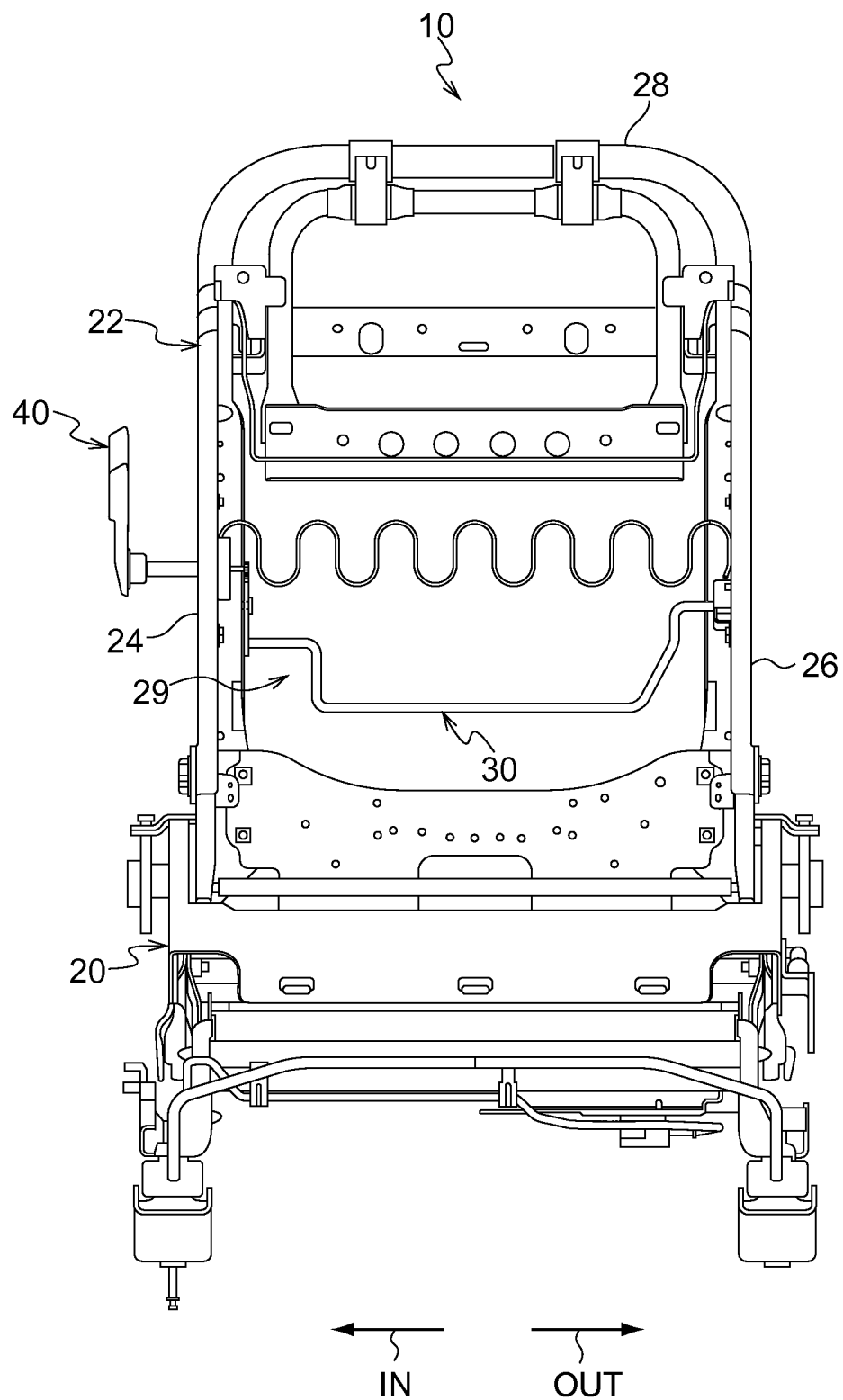
FIG. 2 is a front view illustrating a frame at an inside of a seat.

A seat cushion frame 20 such as that illustrated in FIG. 2 is disposed inside the seat cushion 12, and a seatback frame 22 such as that illustrated in FIG. 2 is disposed inside the seatback 14. The seatback frame 22 is equipped with an inside member 24 configuring a vehicle inside side portion, an outside member 26 configuring a vehicle outside (arrow OUT direction side) side portion, and a coupling member 28 that couples together an upper end of the inside member 24 and an upper end of the outside member 26.

A crank shaped rod 30 configuring a portion of a lumbar support mechanism 29 is disposed between the inside member 24 and the outside member 26. As illustrated in FIG. 3, the crank shaped rod 30 is configured including: a first horizontal portion 30A formed towards the vehicle width direction inside; a vertical portion 30B that extends from a vehicle width direction outside end portion of the first horizontal portion 30A in a direction perpendicular to the first horizontal portion 30A; a lumbar support portion 30C that extends horizontally from a lower end portion of the vertical portion 30B towards the vehicle width direction outside; an inclined portion 30D that extends to be inclined from a vehicle width direction outside end portion of the lumbar support portion 30C; and a second horizontal portion 30E that extends horizontally from an upper end portion of the inclined portion 30D towards the outside member 26. The lumbar support portion 30C is disposed at a position so as to support the lumbar region (not illustrated in the drawings) of the occupant H that is resting against the seatback 14. The first horizontal portion 30A of the crank shaped rod 30 is supported by a lumbar support drive portion 32, described later, and the second horizontal portion 30E is rotatably supported by a shaft bearing 34 provided to the outside member 26.

As illustrated in FIG. 3 and FIG. 4, the lumbar support drive portion 32 that configures a portion of the lumbar support mechanism 29 is provided at the seat inside of the inside member 24. One end side of the lumbar support drive portion 32 is provided with a shaft bearing 33 that rotatably supports a rotation shaft 38 to which is fixed a pinion gear 36. The shaft bearing 33 is fixed to the inside member 24 by for example a bolt, not illustrated in the drawings. The rotation shaft 38 is horizontally supported by the shaft bearing 33. A link support shaft 42 is attached to the inside member 24 parallel to the rotation shaft 38 and below the shaft bearing 33. A flat plate shaped link 44 is supported by the link support shaft 42 so as to capable of swinging.

A sector gear 46 that meshes with the pinion gear 36 is formed at an upper portion of the link 44. An end portion of the crank shaped rod 30 (first horizontal portion 30A end portion) is fixed to a side face of a lower portion of the link 44. The axial center of the second horizontal portion 30E of the crank shaped rod 30 and the link support shaft 42 are disposed coaxially to each other. Namely, the axial center of the second horizontal portion 30E and the link support shaft 42 are disposed along the rotation center axis RL indicated by the single dashed line in FIG. 3. The crank shaped rod 30 accordingly swings about the rotation center axis RL.

Figure 4A:
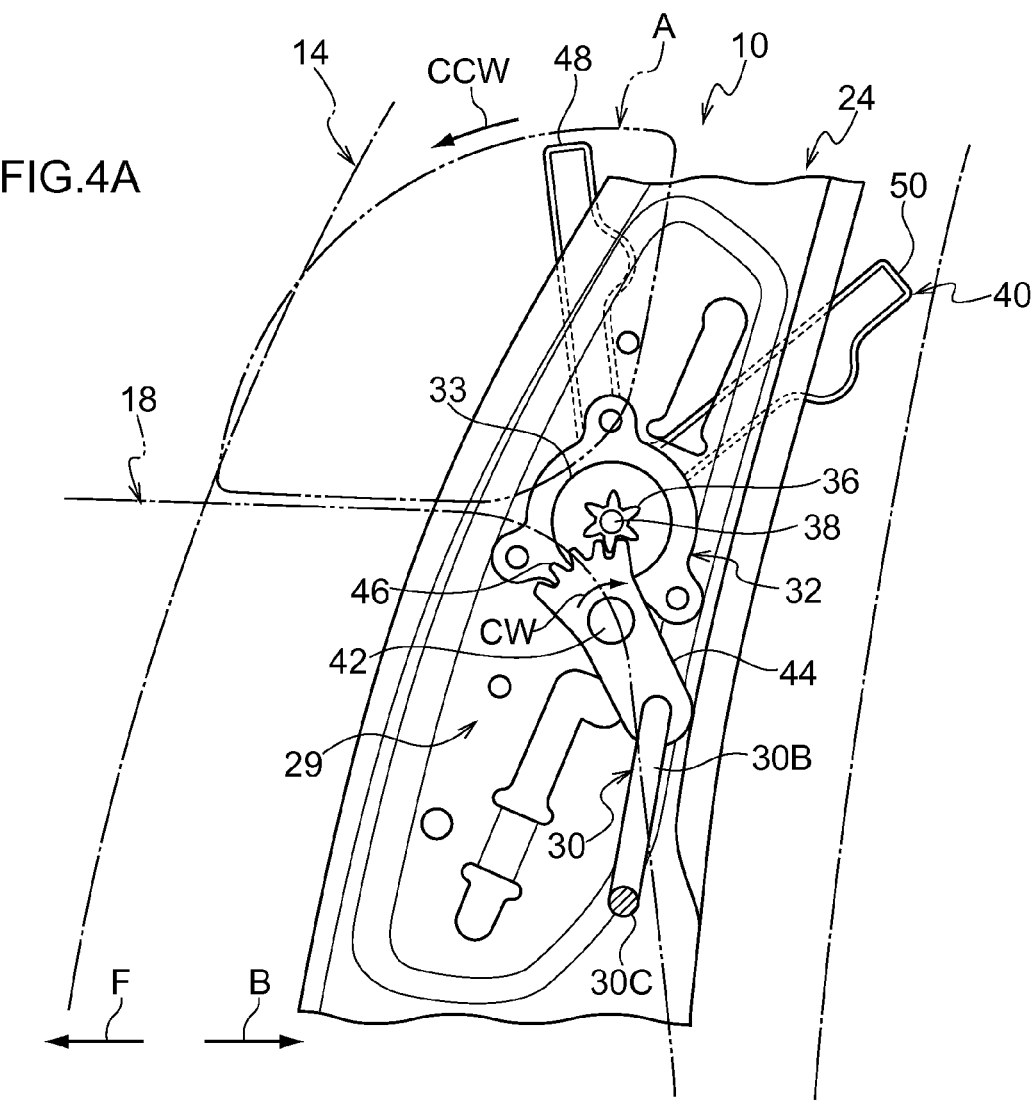
FIG. 4A is a side view of a seatback, illustrating a lumbar support mechanism with an operation member at an initial position.
Figure 4B:
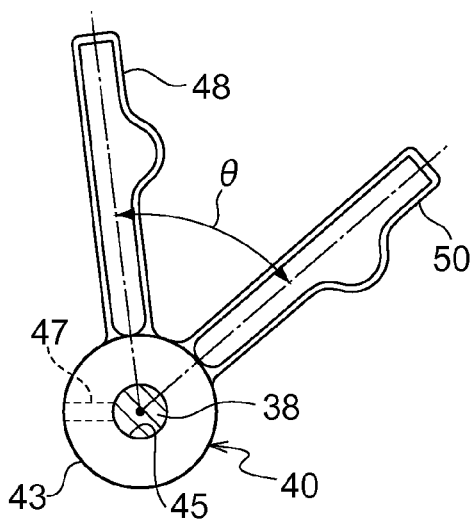
FIG. 4B is a side view of an operation member.

The end portion of the rotation shaft 38 fixed with the pinion gear 36 projects from an outside face of the inside member 24 towards the vehicle width direction inside. As illustrated in FIG. 3 and FIG. 4B, a lumbar support operation member 40 is attached to the projecting portion of the rotation shaft 38. The lumbar support operation member 40 is provided with a shaft attachment portion 43. A hole 45 into which the rotation shaft 38 is inserted is formed at the center of the shaft attachment portion 43. The rotation shaft 38 is inserted into the hole 45, and the rotation shaft 38 is fixed to the shaft attachment portion 43 by for example a screw 47.

The shaft attachment portion 43 is integrally provided with a first lever 48 and a second lever 50, that each extends in a straight line shape from an outer peripheral portion of the shaft attachment portion 43 towards outside in a radial direction of the rotation shaft 38. As illustrated in FIG. 4B, the first lever 48 and the second lever 50 are provided so as to form an angle θ as viewed in the axial direction of the rotation shaft 38. Moreover, as illustrated in FIG. 4A, the rotation shaft 38 that is attached to the lumbar support operation member 40 is provided in the vicinity of the rear end of an upper face of the console box 18.

Note that the rotation shaft 38 is provided with a brake, not illustrated in the drawings, with configuration made such that the rotation shaft 38 rotates when the lumbar support operation member 40 is rotated. An example of such a brake mechanism is for example a mechanism wherein a coil spring is disposed inside a hollow formed in the rotation shaft 38, wherein the coil spring is normally disposed in a spring diameter expanded direction, and the rotation shaft 38 is prevented from rotating due to friction between the spring and an inside of the rotation shaft 38 (namely, the brake of the rotation shaft 38 is on). On rotation operation of the lumbar support operation member 40, a diameter of the spring is reduced such that the rotation shaft 38 becomes capable of rotation.

Operation

Explanation follows regarding operation of the present exemplary embodiment. FIG. 4A illustrates an initial position of the lumbar support operation member 40 and the crank shaped rod 30. In the initial position, the lumbar support portion 30C of the crank shaped rod 30 is positioned at the vehicle rearmost side (the arrow B direction, this being a direction away from the lumbar region of the occupant H (not illustrated in FIG. 4; see FIG. 1) seated in the vehicle seat 10). The first lever 48 of the lumbar support operation member 40 is substantially vertical, and the second lever 50 is inclined towards the vehicle rear side of the first lever 48. Note that in the following description, a region A indicated by double dashed lines in FIG. 4A to FIG. 7 indicates a region where the hand of the occupant H seated in the vehicle seat 10 easily reaches, as illustrated in FIG. 1. In other word, the region A is an area in which the lumbar support operation member 40 is easily operated by the occupant H.

Figure 5:
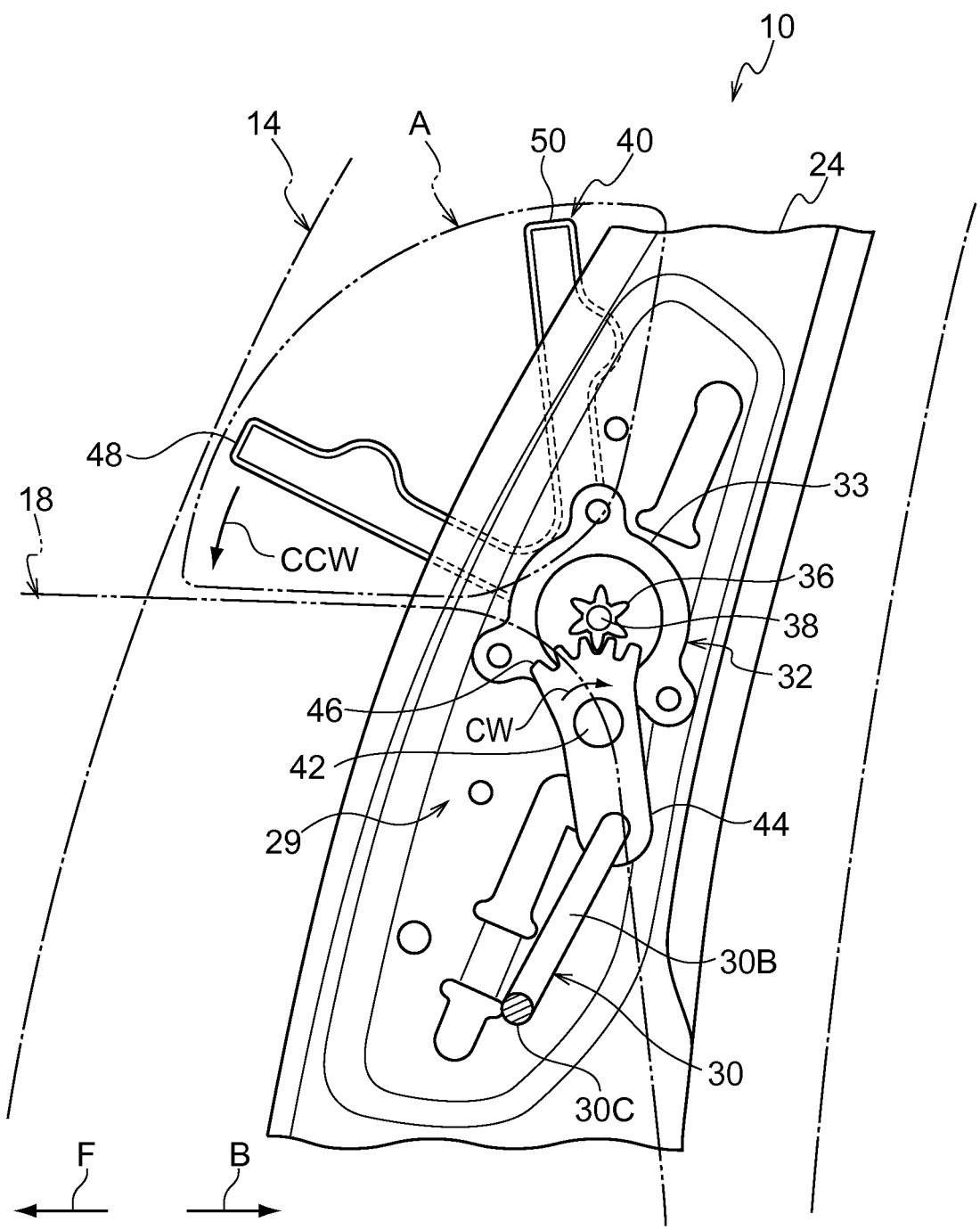
FIG. 5 is a side view of a seatback, illustrating a lumbar support mechanism with an operation member in a state rotated further than the position illustrated in FIG. 4A.

From the initial position, when the occupant H manually rotates the first lever 48 in a counter clockwise direction CCW (namely, pushes it down towards the vehicle front side), the sector gear 46 that is enmeshed with the pinion gear 36 rotates in a clockwise direction CW, and as illustrated in FIG. 5, the lumbar support portion 30C of the crank shaped rod 30 moves towards the vehicle front side from the position illustrated in FIG. 4A, namely towards the lumbar region of the occupant H. As illustrated in FIG. 1, a separation between the seatback 14 and the console box 18 is narrow. Accordingly, depending on the position of the seatback 14, when the occupant H attempts to rotate the first lever 48 further in the counter clockwise direction CCW than the state illustrated in FIG. 5, it may become difficult to rotate the first lever 48 since the fingers of the occupant H are unable to enter the gap between the seatback 14 and the console box 18, restricting movement of the lumbar support portion 30C towards the lumbar region.

Figure 6:
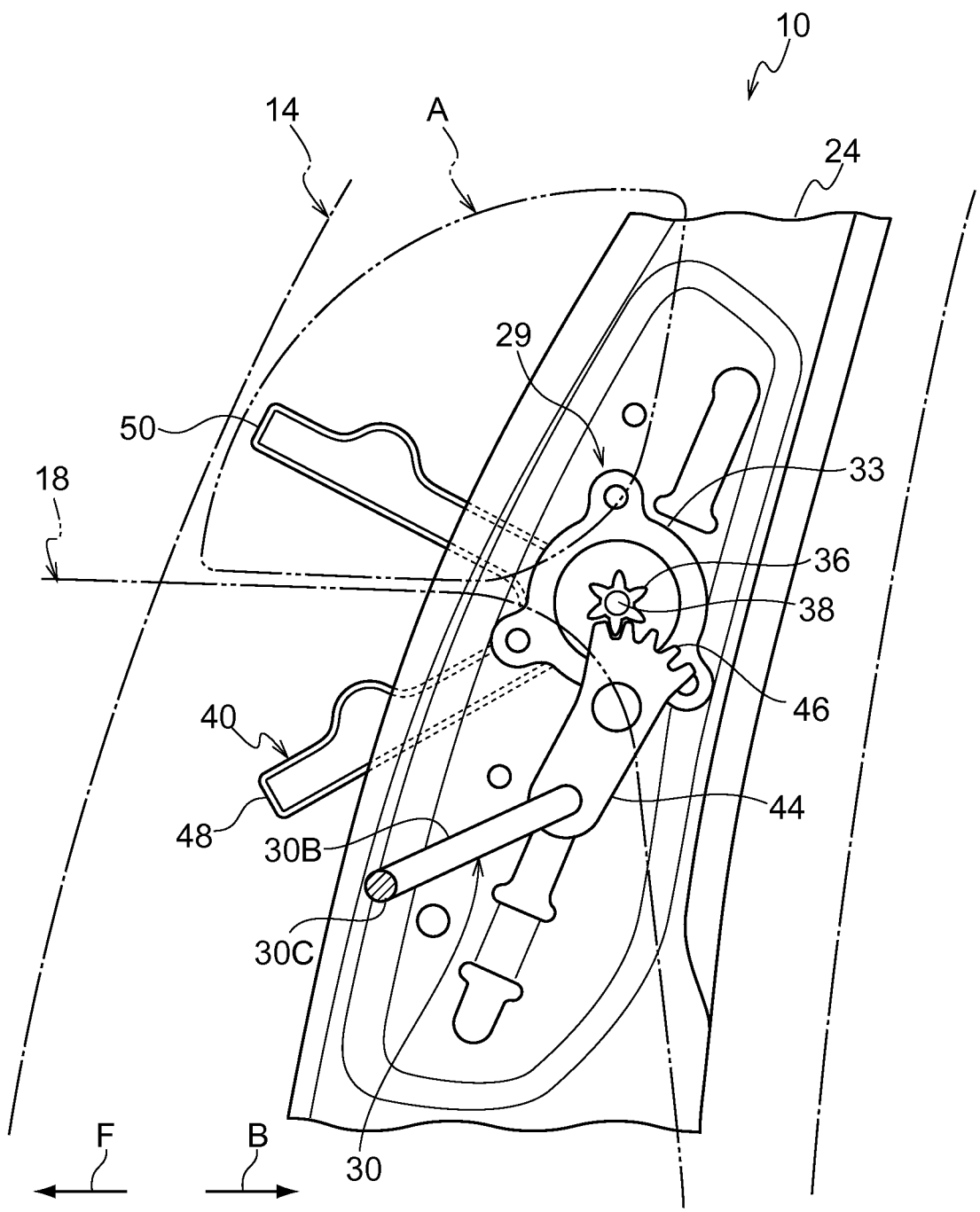
FIG. 6 is a side view of a seatback, illustrating a lumbar support mechanism with an operation member in a state rotated further than the state illustrated in FIG. 5.

However, in the lumbar support operation member 40 of the present exemplary embodiment, the second lever 50 is provided on other direction side to the counter clockwise direction CCW of the first lever 48 (namely in the clockwise direction). Accordingly, as illustrated in FIG. 5, the second lever 50 is present in the region A in which the lumbar support operation member 40 is easily operated, and is moreover at a position apart further from the console box 18 than the first lever 48. As illustrated in FIG. 6, the occupant H is accordingly able to operate the second lever 50 to rotate in the counter clockwise direction CCW than the position illustrated in FIG. 5. The lumbar support portion 30C can accordingly be moved further towards the lumbar region of the occupant H.

Due to providing the lumbar support operation member 40 of the vehicle seat 10 with the two levers in the present exemplary embodiment, namely the first lever 48 and the second lever 50, at different positions in the rotation direction, an increased angle of operation of the lumbar support operation member 40 can be achieved than operation by a single lever. As a result, the movement amount of the lumbar support portion 30C can be increased. Note that the angle θ formed between the first lever 48 and the second lever 50 is optimally determined by such factors as a relationship between a rotation angle of the rotation shaft 38 and movement amount of the lumbar support portion 30C, the initial position of the lumbar support operation member 40, and a positional relationship between the lumbar support operation member 40 and the console box 18.

Other Exemplary Embodiments

Note that the vehicle seat 10 and the lumbar support operation member 40 of the exemplary embodiment described above are examples of the present invention, and various modifications are possible within a range not departing from the spirit of the present invention. For example, the lumbar support operation member 40 is not limited to the shape illustrated in FIG. 4, and may be configured with a shape illustrated in FIG. 7. A lumbar support operation member 52 illustrated in FIG. 7 includes a fan shaped member 54 that has a plate profile and extends from the shaft attachment portion 43 (omitted from illustration in FIG. 7) towards the radial direction outside of the shaft attachment portion 43. One end side of a circular arc portion at an outer peripheral side of the fan shaped member 54 is formed with a protrusion 56, and the other end side is formed with a protrusion 58.

The protrusion 56 is formed at a position corresponding to a leading end portion of the first lever 48 illustrated in FIG. 4. The protrusion 58 is formed at a position corresponding to a leading end portion of the second lever 50 illustrated in FIG. 4.

Figure 7:
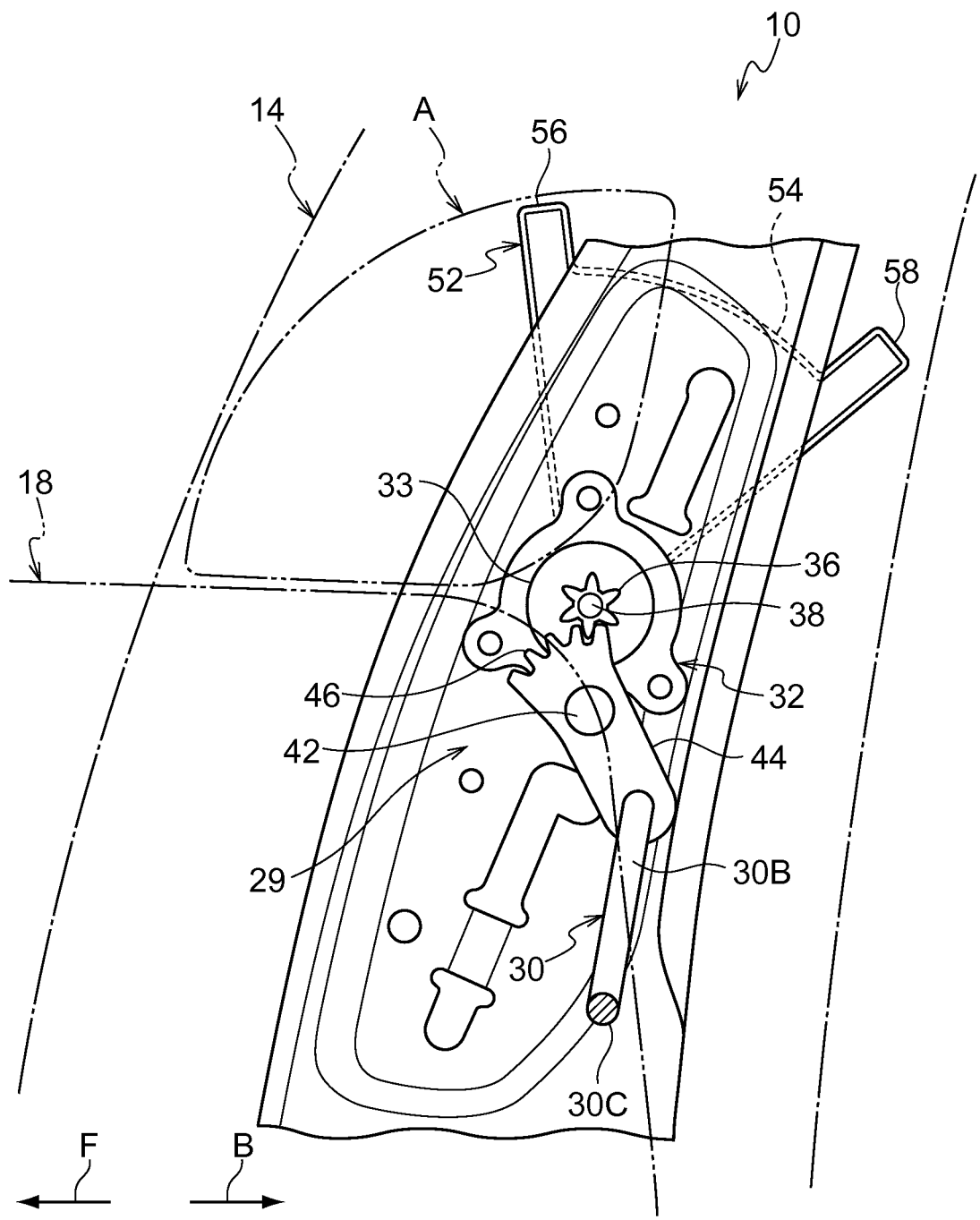
FIG. 7 is a side view of a seatback, illustrating an operation member according to another exemplary embodiment.

The lumbar support operation member 52 illustrated in FIG. 7 can be operated similarly to the lumbar support operation member 40 illustrated in FIG. 4. For example, the protrusion 56 can be used to rotate the lumbar support operation member 52 from an initial position, after which the protrusion 58 can be used to rotate the lumbar support operation member 52 when operation of the protrusion 56 has become difficult. A greater angle of operation can be achieved similarly to with the lumbar support operation member 40, as a result of which the movement amount of the lumbar support portion 30C can be increased.

In the lumbar support mechanism of the vehicle seat 10 of the above exemplary embodiments, configuration is made employing the pinion gear 36, the sector gear 46 and the crank shaped rod 30. However, the lumber support may be moved employing another known configuration, for example another mechanism involving links and cams.

Note that the region of easy operation A of the lumbar support operation member 40 illustrated in FIG. 4A to FIG. 7 is merely an example, and the present invention is not limited thereto. The range of the region A may be varied as appropriate.

What is claimed is:

1. A lumbar support operation member comprising:
  a shaft attachment portion that is configured so as to be fixed to a rotation shaft that rotates about an axis and transmits rotation force to a moving mechanism of a lumbar support provided to a seatback and that is positioned at a side portion of the seatback, the side portion of the seatback being configured to be disposed adjacent to a console box, wherein a region of the side portion located above and forward of the axis is easily accessible to a use's hand; and
  operation portions that are provided at a radial direction outside of the shaft attachment portion, that are separated from each other in a circumferential direction of the shaft attachment portion, and that make the shaft attachment portion rotate, at least one of the operation portions always being disposed in the region to be easily rotated by the user's hand in a downward direction over an entire range of lumbar support operation,
  wherein the operation portions are configured by a first lever and a second lever that extend from the shaft attachment portion to form a V-shape, distal ends of the first and the second levers being spaced apart from each other, the first lever being accessible to the use's hand from a direction parallel to the axis so as to rotate the shaft attachment portion from an initial position to a first position, the second lever being accessible to the user's hand from the direction so as to rotate the shaft attachment portion from the first position to a second position, the first lever being configured to be positioned between the side portion of the seatback and the console box when in the second position.

2. The lumbar support operation member of claim 1, wherein the first and the second levers are provided at an outer peripheral portion of an operation plate that extends from the shaft attachment portion towards the radial direction outside of the shaft attachment portion.

3. A vehicle seat comprising:
- a moving mechanism that moves a lumbar support provided to a seatback;
- a rotation shaft that is positioned at a side portion of the seatback, and that operates the moving mechanism; and
- the lumbar support operation member of claim 2, which is attached to the rotation shaft.

4. A vehicle seat comprising:
- a moving mechanism that moves a lumbar support provided to a seatback;
- a rotation shaft that is positioned at a side portion of the seatback, and that operates the moving mechanism; and
- the lumbar support operation member of claim 1, which is attached to the rotation shaft.

5. A vehicle seat comprising:
- a moving mechanism that moves a lumbar support provided to a seatback;
- a rotation shaft that is positioned at a side portion of the seatback, and that operates the moving mechanism; and
- the lumbar support operation member of claim 1, which is attached to the rotation shaft.

6. The lumbar support operation member of claim 1, wherein:
- in the first position, the first lever of the operation portions is disposed substantially vertical and the second lever is inclined towards a vehicle rear side of the first lever whereby the lumbar support is configured to be positioned at a vehicle rearmost side; and
- in the second position, the second lever is inclined towards a vehicle front side whereby the lumbar support is configured to be positioned at a vehicle front side from the rearmost side.

* * * * *